Aug. 19, 1930.  R. A. McCANN  1,773,194
HIGHWAY CROSSING SIGNAL
Filed Jan. 28, 1930
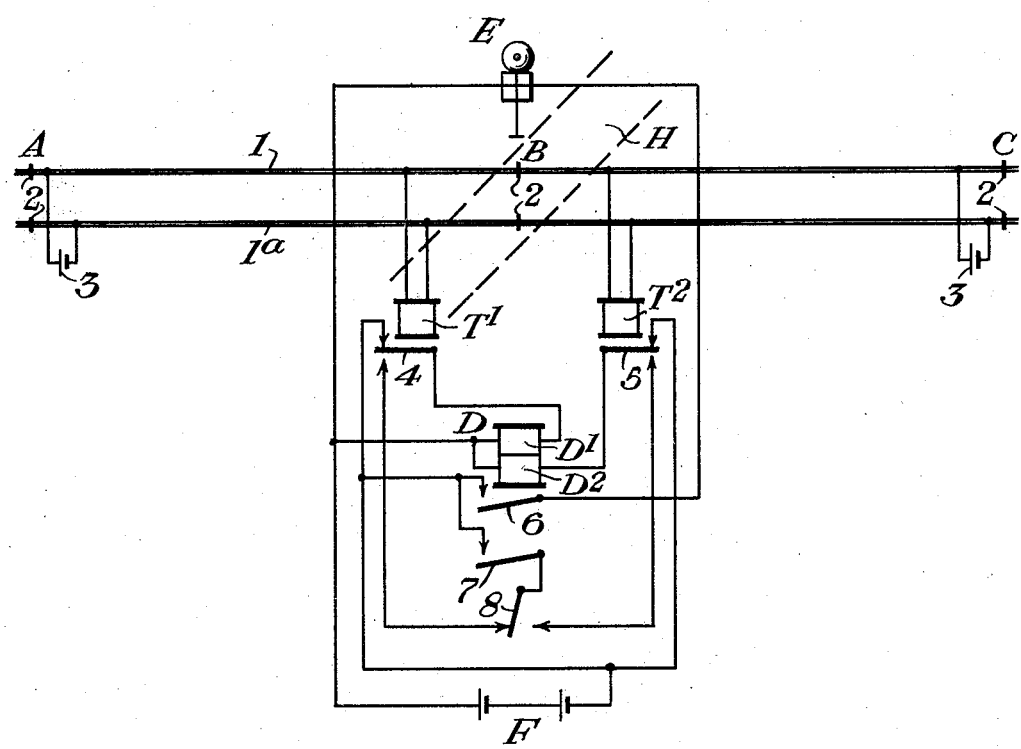
INVENTOR:
R. A. McCann,
by A. L. Vincill
His Attorney Patented Aug. 19, 1930

1,773,194

UNITED STATES PATENT OFFICE

RONALD A. McCANN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

HIGHWAY-CROSSING SIGNAL

Application filed January 28, 1930. Serial No. 423,961.

My invention relates to highway crossing signals, and has for an object the provision of means for controlling a signal at the junction of a highway and a single track railroad without the necessity for utilizing an interlocking relay.

It will describe one form of apparatus embodying my invention, and will then point out the novel features thereof in claims.

The accompanying drawing is a diagrammatic view showing one form of apparatus embodying my invention.

Referring to the drawing, the reference characters 1 and $1^a$ designate the track rails of a stretch of single track along which traffic moves at times in both directions. These rails are divided by insulated joints 2 to form two track sections A—B and B—C, and the track is intersected by a highway H at substantially the junction of these sections. Located at the junction of the highway H and the railroad track, is a highway crossing signal E, which, in the form here shown is an electric bell.

Each track section is provided with a track circuit, comprising the usual track battery 3 and the usual track relay T the relays for the sections A—B and B—C, being designated $T^1$ and $T^2$, respectively.

The highway crossing signal E is controlled by the track relays $T^1$ and $T^2$, and by a signal relay D. Relay D has two operating windings $D^1$ and $D^2$, neutral contacts 6 and 7, and a polarized contact 8. The parts of this relay are so adjusted that when both of the windings $D^1$ and $D^2$ are energized, the neutral armature is released, whereas when only one winding or the other is energized, the neutral armature closes and the polar armature swings to one position or the other according to which of the windings is energized. When winding $D^1$ alone is energized, polar contact 8 is swung to the left, whereas when winding $D^2$ alone is energized, polar contact 8 is swung to the right. The relay D is further characterized by the fact that the polar armature operates before the neutral armature when either winding of the relay becomes deenergized.

As shown in the drawing, both of the track sections are unoccupied, so that both of the track relays $T^1$ and $T^2$ are energized. Winding $D^1$ of relay D is, therefore, energized by a main circuit which passes from a battery F, through the front point of contact 4 of track relay $T^1$ and winding $D^1$ to battery F. Winding $D^2$ is energized by a similar main circuit which passes from battery F, through the front point of contact 5 of track relay $T^2$ and winding $D^2$ to battery F. The neutral front contacts of relay D are, therefore, open so that the circuit for the highway crossing signal E is open at contact 6.

I will now assume that a train moving to the right enters section A—B. This will cause track relay $T^1$ to open, thereby opening at the front point of contact 4 the main circuit for winding $D^1$, with the result that winding $D^2$ alone will be energized. This will cause the front neutral contacts 6 and 7 to close, and it will also cause polar contact 8 to swing to the right, and inasmuch as the polar armature responds before the neutral armature, winding $D^1$ will remain deenergized. The closing of the neutral armature will close the circuit for the signal E at front contact 6, which circuit will be obvious from the drawing without explanation. When the front end of the train enters section B—C, it will deenergize track relay $T^2$, whereupon an auxiliary circuit for winding $D^2$ will become closed, which circuit passes from battery F, through neutral front contact 7, polar contact 8 in the right-hand position, back point of contact 5 of track relay $T^2$, and winding $D^2$, to battery F. When the rear end of the train passes out of the section A—B, the main circuit for winding $D^1$ will again become closed through the front point of contact 4 of track relay $T^1$. Both windings $D^1$ and $D^2$ will then be energized, with the result that the neutral armature of relay D will release and so the operation of the crossing signal E will stop. When the train passes out of section B—C, track relay $T^2$ will again become energized, and the parts will be restored to the positions in which they are shown in the drawing.

When a train moving toward the left passes through the stretch of track shown in the drawing, the operation will be the same, except that polar contact 8 will be swung to the left as soon as track relay $T^2$ opens, with the result that an auxiliary circuit for winding $D^1$ will become closed when the train enters section A—B, and so the operation of the crossing signal will cease as soon as the rear end of the train passes out of section B—C.

Although I have herein shown and described only one form of apparatus embodying my invention, it is understood that various changes and modifications may be made therein within the scope of the appended claim without departing from the spirit and scope of my invention.

Having thus described my invention, what I claim is:

In combination, two adjoining sections of railway track, a highway intersecting said track at substantially the junction of said sections, a track circuit including a track relay for each of said sections, a signal relay having two operating windings and a neutral armature as well as a polar armature, and characterized by the fact that when both windings are energized the neutral armature is released whereas when only one winding or the other is energized the neutral armature closes and the polar armature swings to one position or the other according to which winding is energized, a main circuit for the first winding of said signal relay including a source of current and a front contact of the first track relay, a main circuit for the second winding of said signal relay including said source and a front contact of the second track relay, an auxiliary circuit for the first winding of said signal relay including said source and a back contact of the first track relay as well as a front neutral contact of the signal relay and a polar contact of the signal relay which closes when only the first winding is energized, an auxiliary circuit for the second winding of said signal relay including said source and a back contact of the second track relay as well as a front neutral contact of the signal relay and a polar contact of the signal relay which closes when only the second winding is energized, and a highway signal located at the intersection of said railway track and said highway and controlled by said signal relay.

In testimony whereof I affix my signature.

RONALD A. McCANN.